3,228,905
SYNTHETIC RUBBER LATEX REINFORCED WITH INORGANIC PIGMENT AND METHOD FOR MAKING SAME
Anselm Talalay, New Haven, Conn., and Edward A. Willson, Akron, Ohio, assignors to The B. F. Goodrich Company, New York, N.Y., a corporation of New York
No Drawing. Filed Sept. 12, 1960, Ser. No. 55,196
13 Claims. (Cl. 260—29.7)

This invention relates to an internally-reinforced latex and pertains more particularly to a latex containing polymer particles which are comprised of a heterogeneous mixture of an elastomeric butadiene hydrocarbon polymer and an inorganic reinforcing pigment and to a method for making such a latex.

When compounding "dry" rubber, a reinforcing pigment usually is mixed into the rubber composition in order to increase the hardness, strength and resistance to tear or abrasion of the valcanizate. The reason why improved properties are obtained when a reinforcing pigment is added to a rubber composition is not fully understood, although it has been observed that to obtain optimum improvement in physical properties the very fine particles of reinforcing pigment must be uniformly dispersed throughout the rubber composition. The addition of the reinforcing pigment to the "dry" rubber is readily accomplished, since the reinforcing pigment can be added with the rubber directly into a Banbury mixer in which the rubber and other compounding ingredients of the composition are intermixed or can be added to the rubber along with the other compounding ingredients of the composition as the rubber is being mixed on a roll mill. With either of these methods of mixing, the reinforcing pigment can be thoroughly dispersed throughout the rubber composition. However, when rubber products are to be made directly from a latex, the mere mixing of a reinforcing pigment into the latex does not provide a reinforcing effect analogous to that obtained when a reinforcing pigment is dispersed uniformly throughout a "dry" rubber composition. The analogous condition does not exist probably because the reinforcing pigment when mixed into a latex is not as intimately associated with the polymer after the latex is coagulated as it is when it is mechanically mixed into a "dry" rubber composition. The explanation possibly lies in the fact that in mixing a latex the shear forces encountered are of a much lower order of magnitude than when compounding a "dry" rubber and are incapable of distorting the polymer particles of the latex sufficiently to permit incorporation of the reinforcing pigment into the polymer particles. Indeed, since the stability of a latex depends upon the presence of a colloidal protective layer over the polymer particles of the latex, the exertion of shear forces large enough to penetrate the protective layer and distort the polymer particles would result in the irreversible coagulation of the latex. It is for this reason, apparently, that a strong bond between the reinforcing pigment and polymer in the latex is not attained when a reinforcing pigment merely is mixed into a latex and the latex coagulated. In view of the above discussion, it will be apparent that a convenient and economical method for actually incorporating an inorganic reinforcing pigment into elastomeric polymer particles of the latex to provide an internally-reinforced latex would be beneficial.

The present invention provides a latex in which particles of an inorganic reinforcing pigment are incorporated into elastomeric butadiene hydrocarbon polymer latex particles, the particles of inorganic material functioning as a reinforcing pigment for the butadiene hydrocarbon polymer. In accordance with the process of this invention, an aqueous dispersion of the inorganic reinforcing pigment is mixed with a surface-unsaturated butadiene hydrocarbon polymer latex, the latex is frozen to a solid condition at a temperature above temperatures at which the latex (with reinforcing pigment) coagulates and the latex then is thawed. The freezing and thawing of the latex causes butadiene hydrocarbon polymer particles to coalesce and form larger particles, as is described in the copending application of Leon Talalay, Serial No. 601,612, filed August 2, 1956 and now U.S. Patent No. 3,031,427. As several butadiene hydrocarbon polymer particles coalesce, they trap particles of the inorganic reinforcing pigment between them and, as the several butadiene hydrocarbon polymer particles unite into a larger single particle, the particles of inorganic reinforcing pigment trapped therebetween are engulfed by the butadiene hydrocarbon polymer and are incorporated in the larger polymer particle formed by the coalescence of the several smaller butadiene hydrocarbon polymer particles.

Emulsion-polymerized surface-unsaturated aqueous dispersions of butadiene hydrocarbon polymer can be internally reinforced with inorganic reinforcing pigment (that is, have particles of inorganic reinforcing pigment incorported into particles of butadiene hydrocarbon polymer) by the process of this invention. The term "butadiene hydrocarbon polymer" as used herein refers to any polymer containing at least 51 percent by weight of a bound butadiene-1,3 hydrocarbon, such as butadiene-1,3 itself or its homologs such as isoprene, 1,4-dimethyl butadiene-1,3; 2,3-dimethyl butadiene-1,3 and the like, and includes homopolymers of butadiene-1,3 hydrocarbons such as polyisoprene and polybutadiene as well as interpolymers of butadiene-1,3 hydrocarbons with one another or with up to 49 percent by weight of one or more other unsaturated monomers copolymerizable therewith such as styrene and substituted styrenes, acrylic and methacrylic acids and their esters and nitriles, vinyl pyridine and other unsaturated vinyl and vinylidene monomers.

Since the process of this invention involves freezing the butadiene hydrocarbon polymer latex (after the inorganic reinforcing pigment has been added thereto), it is apparent that only latices which can be frozen to a solid condition without coagulating objectionably can be used. Also, it is necessary in accordance with the present invention that the butadiene hydrocarbon polymer particles be surface-unsaturated (that is, the surfaces of the particles of butadiene hydrocarbon polymer in the latex are incompletely covered with emulsifier) at the time the latex is frozen. It is preferable that the butadiene hydrocarbon polymer latex be one that has been polymerized using a fatty acid soap as the emulsifier, preferably a sodium or potassium soap of a fatty acid (either saturated or unsaturated) having from 12 to 18 carbon atoms. The process of this invention is useful for internally-reinforcing latices of any concentration.

The aqueous dispersion of inorganic reinforcing pigment added to the butadiene hydrocarbon polymer latex in accordance with this invention may be any finely-divided solid inorganic material suitable for reinforcing rubber compositions. The inorganic materials suitable for this purpose are well known to the rubber compounder. The inorganic materials most commonly used for reinforcing rubbers are finely-divided carbon (commonly referred to as carbon blacks), calcium carbonate, clays, talc (magnesium silicate, hydrous magnesium silicate, calcium silicate or mixtures thereof), pyrophyllite (hydrous aluminum silicate), barytes (barium sulfate), blanc fixe (barium sulfate), whiting (by-product calcium carbonate or ground limestone), silica and silicon monoxide (monox). The reinforcing pigment must be in a finely-divided state in order for it to enhance effectively the physical properties of the rubber vulcanizate. Desirably, the inorganic reinforcing pigment has an average particle size of less than 2000 A. The amount and type of reinforcing pigment added to the latex before the latex is frozen will vary depending upon the degree of reinforcement desired. However, the addition of the reinforcing pigment dispersion may tend to destabilize the latex, especially during freezing. Accordingly, the amount of reinforcing pigment dispersion added to the latex before the latex is frozen should not be an amount sufficient to cause coagulation of the latex when frozen. The destabilizing effect of the reinforcing pigment dispersion on the latex will vary depending upon the particular reinforcing pigment dispersion and particular latex being used. A procedure which can be followed to determine the maximum amount of the reinforcing pigment dispersion which can be used merely involves adding varying amounts of the reinforcing pigment dispersion to samples of the latex and freezing and thawing the samples of latex at the selected freezing conditions to establish the proportion of reinforcing pigment dispersion which can be added to the latex without causing the latex to coagulate at the freezing temperature selected. The reinforcing pigment should not be added directly to the latex but, rather, as indicated above should be added to the latex as an aqueous dispersion of the reinforcing pigment, as is customary in the compounding of latices. The aqueous dispersion of the reinforcing pigment normally also contains a dispersing agent to maintain the reinforcing pigment in dispersion, usually from about 0.1 to 2.0 parts by weight (dry) of the dispersing agent being used for 100 parts by weight of the reinforcing pigment. The procedure for making aqueous dispersions of finely-divided inorganic materials is well known. The dispersion of the reinforcing pigment can be added to the latex in any convenient manner, such as by adding the reinforcing pigment dispersio to the latex while the latex is being stirred in conventional latex mixing tank.

Since, as mentioned in the said copending application Serial No. 601,612, it is necessary that the surfaces of the butadiene hydrocarbon polymer particles be incompletely covered with emulsifier (surface unsaturated) at the time the latex is frozen in order that several smaller butadiene hydrocarbon polymer particles will coalesce to form larger particles, the total amount of emulsifier in the latex after the addition of the inorganic reinforcing pigment dispersion to the butadiene hydrocarbon polymer latex must not be sufficient to cause complete surface coverage of the butadiene hydrocarbon polymer particles with emulsifier. Normally, it is preferred that the total amount of emulsifier in the butadiene hydrocarbon polymer latex after the inorganic reinforcing pigment dispersion has been added thereto not exceed about 5 parts by weight (dry) of emulsifier for every 100 parts by weight (dry) of the butadiene hydrocarbon polymer in the latex at the time of freezing.

The butadiene hydrocarbon polymer latex after the inorganic reinforcing pigment dispersion has been added thereto is frozen to a solid state in any convenient way, although it is preferable that it be frozen as rapidly as possible. The frozen latex need not be retained in a frozen condition for more than a moderate time (1 to 5 seconds being sufficient), since apparently the agglomeration of the butadiene hydrocarbon polymer particles (with the attendant entrapment of the reinforcing pigment particles in the larger agglomerated particles of butadiene hydrocarbon polymer) takes place either at the time the latex changes from a fluid to the frozen solid phase or at the time the frozen latex changes from the solid to the fluid state upon thawing. The frozen latex then is thawed in any convenient way, but preferably is thawed as rapidly as is practical. Normally, the latex is frozen at from 30 to −50° F., although in some instances it may be desirable to freeze the latex at even lower temperatures. Excellent results have been obtained by freezing the butadiene hydrocarbon polymer latex (after the addition of the inorganic reinforcing pigment dispersion thereto) on the surface of a slowly revolving metal drum which is partly immersed in a reservoir of the latex. As the drum revolves and the peripheral surface of the drum is withdrawn from the reservoir of latex, a layer of the latex adheres to the drum surface. The drum is internally cooled with brine maintained at a sufficiently low temperature that the temperature of the peripheral surface of the drum is below the freezing temperature of the aqueous phase of the latex adhering thereto whereby the thin layer of latex adhering to the peripheral surface of the drum is completely frozen within a very short time (usually within about 2 to 10 seconds). The frozen layer of latex is scraped (by means of a doctor blade) from the surface of the drum into a heated agitator tank in which the frozen latex rapidly is thawed. The thawed latex then is drained from the tank. Upon thawing it is found that, as a result of the freezing and/or thawing operation, smaller butadiene hydrocarbon polymer particles have united to form larger butadiene hydrocarbon polymer particles and in so doing have entrapped inorganic reinforcing pigment particles within the larger particles. It will be appreciated that the agglomerated butadiene hydrocarbon polymer particles internally-reinforced with inorganic reinforcing pigment particles comprise a heterogeneous mixture of butadiene hydrocarbon polymer and inorganic reinforcing pigment.

As was pointed out in the said copending application Serial No. 601,612, the conditions at which the latex is frozen and then thawed affect the degree of agglomeration which occurs. The conditions at which the latex is frozen and then thawed also are of importance in the present invention. Although the temperature at which the latex (the butadiene hydrocarbon polymer latex containing the inorganic reinforcing pigment dispersion admixed therewith) is frozen may be any temperature at which the latex will freeze to a solid condition which is above temperatures at which the latex coagulates, the latex preferably is frozen at as low a temperature as possible. However, at lower freezing temperatures approaching temperatures at which the latex coagulates an objectionable amount of coagulum may be present in the thawed latex. If the amount of coagulum which may be formed would be objectionable, considering the purpose for which the latex is intended to be used, the amount of coagulum can be reduced or completely eliminated by freezing and/or thawing the latex more rapidly and/or by freezing the latex at a higher temperature. Normally, the latex is frozen at from 30 to −50° F., although in some instances it may be desirable to freeze the latex at even lower temperatures as long as the temperature is not sufficiently low to coagulate the latex. The latex preferably is frozen to a solid condition as rapidly as possible, desirably within 5 minutes and preferably within 1 minute after it is subjected to the temperature at which it is to be frozen.

The pH of the latex (after the inorganic reinforcing pigment dispersion has been admixed therewith) should be considered. Normally, improved results can be obtained if the pH of the latex is reduced before being frozen. However, reducing the pH of the latex has the effect of destabilizing the latex and too great a reduction in pH will cause the latex to coagulate during the freezing and/or thawing operation, particularly if the latex is frozen at a relatively low temperature. If coagulation of the latex does occur, either the pH of the latex and/or the temperature at which the latex is frozen should be raised to overcome this condition.

If too little of the surface area of the particles of polymer in the latex is covered with emulsifier at the time of freezing, the latex will be relatively unstable and cannot be frozen at low temperatures and pH without coagulating. If such a condition exists, the addition of emulsifier to the latex before the latex is frozen generally will improve the stability of the latex. However, it should be remembered that, if the surfaces of the particles of butadiene hydrocarbon polymer are completely covered with emulsifier at the time of freezing, agglomeration of butadiene hydrocarbon polymer particles to form larger particles will not occur. Therefore, if emulsifier is added to the latex to give the latex greater stability, the addition of emulsifier must not be sufficiently great to cause complete coverage of the polymer particles with emulsifier.

The latex after having been frozen to a solid condition should be thawed as rapidly as possible since it has been found that more coagulum tends to be formed if the latex is thawed slowly than when the latex is more rapidly thawed. The presence of excessive coagulum in the thawed latex is considered objectionable when the latex is intended to be used for certain applications. For example, in the manufacture of foam rubber, the presence of over about 1 percent coagulum usually is considered to be objectionable, although the presence of greater amounts of coagulum in the thawed latex may not be objected to in the manufacture of other products from latex.

The reinforcement of polymer particles of a latex by the process of this invention is illustrated by the following example, although it will be understood that the invention is not intended to be limited to these illustrations.

*Example I*

A commercial butadiene-styrene copolymer latex (70 butadiene/30 styrene copolymer, Ameripol 4850 latex) was frozen rapidly at about —20° F., was thawed rapidly and concentrated by evaporation to a total solids of about 60%. The concentrated latex was divided into four samples (Latex Samples 1, 2, 3, and 4). 20 parts by weight (dry) of fine particle size hydrated silica (Hi-Sil 233) in the form of an aqueous dispersion of the hydrated silica (0.2 part by weight of potassium hydroxide per 100 parts by weight of hydrated silica being used as a dispersing agent) was added to every 100 parts by weight (dry) of butadiene hydrocarbon polymer in Latex Sample 2; 30 parts by weight (dry) of the Hi-Sil 233 dispersion per 100 parts by weight (dry) of butadiene hydrocarbon polymer was added to Latex Sample 3; and 40 parts by weight (dry) of the Hi-Sil 233 dispersion per 100 parts by weight (dry) of butadiene hydrocarbon polymer was added to Latex Sample 4. The four latex samples were compounded with equal proportions of vulcanizing agents, were formed into films and were vulcanized for 90 minutes at 105° C. These films exhibited the following properties:

| Film | Ultimate tensile (lbs./sq. in.) | Ultimate elong. (percent) | S/So* (stress-relaxation) |
|---|---|---|---|
| From Latex Sample 1 | 675 | 560 | .880. |
| From Latex Sample 2 | 765 | 515 | Broke at 120 min. |
| From Latex Sample 3 | 955 | 540 | Do. |
| From Latex Sample 4 | 1,440 | 595 | .770. |

$*\frac{S}{So} = \frac{\text{Stress at 2500 minutes at 50° C. and 200\% elongation}}{\text{Stress at 1 minute at 50° C. and 200\% elongation}}$ To three additional samples of the Ameripol 4850 latex (Latex Samples 5, 6 and 7) was added 20 parts by weight (dry) of the Hi-Sil 233 dispersion per 100 parts by weight (dry) of butadiene hydrocarbon polymer in the latex samples before the latex samples were frozen. Latex Samples 5, 6 and 7 then were frozen rapidly at about —20° F., were thawed rapidly and were concentrated to a total solids of about 60%. 10 additional parts by weight (dry) of the Hi-Sil 233 dispersion per 100 parts by weight (dry) of butadiene hydrocarbon polymer was added to Latex Sample 6 and 20 additional parts by weight (dry) of the Hi-Sil 233 dispersion per 100 parts by weight (dry) of butadiene hydrocarbon polymer was added to Latex Sample 7. The three latex samples were compounded with equal proportions of vulcanizing agents and were formed into films which also were vulcanized for 90 minutes at 105° C. These films exhibited the following properties:

| Film | Ultimate tensile (lbs./sq. in.) | Ultimate elong. (percent) | S/So (stress-relaxation) |
|---|---|---|---|
| From Latex Sample 5 | 870 | 540 | Broke at 30 min. |
| From Latex Sample 6 | 1,650 | 640 | .835. |
| From Latex Sample 7 | 2,030 | 660 | .805. |

*Example II*

A quantity of Ameripol 4850 butadiene-styrene copolymer latex (the same latex as used in Example I), was frozen rapidly at about —20° F., was thawed rapidly and concentrated by evaporation to a total solids of about 60%. The concentrated latex was divided into three samples (Latex Samples 8, 9 and 10). 20 parts by weight (dry) of fine particle size clay (Huber PPS 143 clay) in the form of an aqueous dispersion of the clay [0.12 part by weight of potassium hydroxide and 0.10 part by weight of polynaphthol sulfonate (Tamol N) per 100 parts by weight of the clay being used as dispersing agents] was added to every 100 parts by weight (dry) of butadiene hydrocarbon polymer in Latex Sample 8; 30 parts by weight (dry) of the Huber PPS 143 clay dispersion per 100 parts by weight (dry) of butadiene hydrocarbon polymer was added to Latex Sample 9; and 40 parts by weight (dry) of the Huber PPS 143 clay dispersion per 100 parts by weight (dry) of butadiene hydrocarbon polymer was added to Latex Sample 10. The three latex samples were compounded with equal proportions of vulcanizing agents and were formed into films which were vulcanized for 60 minutes at 105° C. These films exhibited the following properties:

| Film | Ultimate tensile (lbs./sq. in.) | Ultimate elong. (percent) | S/So (stress-relaxation) |
|---|---|---|---|
| From Latex Sample 8 | 920 | 600 | .836. |
| From Latex Sample 9 | 885 | 590 | .790. |
| From Latex Sample 10 | 800 | 550 | Broke at 60 min. |

To three additional samples of the Ameripol 4850 latex (Latex Samples 11, 12 and 13) was added 20 parts by weight (dry) of the Huber PPS 143 clay dispersion per 100 parts by weight (dry) of butadiene hydrocarbon polymer in the latex samples before the latex samples were frozen. Latex Samples 11, 12 and 13 then were frozen rapidly at about —20° F., were thawed rapidly and were concentrated to a total solids of about 60%. 10 additional parts by weight (dry) of the Huber PPS 143 clay dispersion per 100 parts by weight (dry) of butadiene hydrocarbon polymer was added to Latex Sample 12 and 20 additional parts by weight (dry) of the Huber PPS 143 clay dispersion per 100 parts by weight (dry) of butadiene hydrocarbon polymer was added to Latex Sample 13. The three latex samples were compounded with equal proportions of vulcanizing agents and were formed into films which also were vulcanized for 60 minutes at 105° C. These films exhibited the following properties:

| Film | Ultimate tensile (lbs./sq. in.) | Ultimate elong. (percent) | S/So (stress-relaxation) |
|---|---|---|---|
| From Latex Sample 11 | 1,200 | 660 | .830 |
| From Latex Sample 12 | 1,035 | 600 | .825 |
| From Latex Sample 13 | 1,330 | 655 | .817 |

The internally-reinforced latex formed by the process of this invention is useful for any application for which latices heretofore have been used, such as in the manufacture of foam rubber, dipped rubber articles and cast rubber articles.

It will be clear that obvious variations and modifications of this invention may be made without departing from the spirit and scope of this invention as defined in the appended claims.

We claim:

1. A latex containing dispersed individual particles which comprise agglomerated butadiene hydrocarbon polymer having entrapped therein individual particles of inorganic reinforcing pigment which agglomerated particles are formed by the coalescence of dispersed butadiene hydrocarbon polymer particles and the entrapment of individual particles of reinforcing pigment by the coalescing butadiene hydrocarbon polymer particles as they coalesce to form new larger dispersed butadiene hydrocarbon polymer particles.

2. A latex containing dispersed individual particles which comprise agglomerated butadiene-styrene copolymer having entrapped therein individual particles of inorganic reinforcing pigment which agglomerated particles are formed by the coalescence of dispersed butadiene hydrocarbon polymer particles and the entrapment of individual particles of reinforcing pigment by the coalescing butadiene hydrocarbon polymer particles as they coalesce to form new larger dispersed butadiene hydrocarbon polymer particles, said particles of inorganic reinforcing pigment having an average particle size of less than 2000 A.

3. A latex containing dispersed individual particles which comprise agglomerated butadiene-styrene-copolymer having entrapped therein individual particles of inorganic reinforcing pigment which agglomerated particles are formed by the coalescence of dispersed particles of said butadiene-styrene copolymer and the entrapment of individual particles of reinforcing pigment by the coalescing butadiene-styrene copolymer particles as they coalesce to form new larger dispersed butadiene-styrene copolymer particles, said butadiene-styrene copolymer containing at least 51 percent by weight of a bound butadiene-1,3 hydrocarbon.

4. A method for internally reinforcing butadiene hydrocarbon polymer particles of an emulsion-polymerized butadiene hydrocarbon polymer synthetic latex in which the surfaces of the polymer particles are incompletely covered with emulsifier and the polymer constituent of which contains at least 51 percent by weight of a bound butadiene-1,3 hydrocarbon which comprises adding an aqueous dispersion of an inorganic reinforcing pigment to the said butadiene hydrocarbon polymer latex, freezing said latex with said inorganic reinforcing pigment dispersion therein to a solid mass at a temperature above temperatures at which the latex coagulates, and reconstituting a fluid latex from the frozen mass of latex by completely thawing the frozen mass.

5. A method for internally reinforcing butadiene hydrocarbon polymer particles of an emulsion-polymerized butadiene hydrocarbon polymer synthetic latex in which the surfaces of the polymer particles are incompletely covered with emulsifier and the polymer constituent of which contains at least 51 percent by weight of a bound butadiene-1,3 hydrocarbon which comprises adding an aqueous dispersion of an inorganic reinforcing pigment to the said butadiene hydrocarbon polymer latex, freezing said latex with said inorganic reinforcing pigment dispersion therein to a solid mass at a temperature between 30° to —50° F. and at a temperature above temperatures at which the latex coagulates, and reconstituting a fluid latex from the frozen mass of latex by completely thawing the frozen mass.

6. A method for internally reinforcing butadiene hydrocarbon polymer particles of an emulsion-polymerized butadiene hydrocarbon polymer synthetic latex in which the surfaces of the polymer particles are incompletely covered with emulsifier and the polymer constituent of which contains at least 51 percent by weight of a bound butadiene-1,3 hydrocarbon which comprises adding an aqueous dispersion of an inorganic reinforcing pigment to the said butadiene hydrocarbon polymer latex, freezing said latex with said inorganic reinforcing pigment dispersion therein to a solid mass at a temperature between 30° to —50° F. and at a temperature above temperatures at which the latex coagulates and within five minutes after said latex is subjected to the freeze temperature, and reconstituting a fluid latex from the frozen mass of latex by completely thawing the frozen mass.

7. A method for internally reinforcing butadiene hydrocarbon polymer particles of an emulsion-polymerized butadiene hydrocarbon polymer synthetic latex in which the surfaces of the polymer particles are incompletely covered with emulsifier and the polymer constituent of which contains at least 51 percent by weight of a bound butadiene-1,3 hydrocarbon which comprises adding an aqueous dispersion of an inorganic reinforcing pigment to the said butadiene hydrocarbon polymer latex, reducing the pH of the said latex to a pH value above pH values sufficient to cause coagulation of the said latex, freezing said latex with said inorganic reinforcing pigment dispersion therein to a solid mass at a temperature above temperatures at which the latex coagulates, and reconstituting a fluid latex from the frozen mass of latex by completely thawing the frozen mass.

8. A method for internally reinforcing butadiene hydrocarbon particles of an emulsion-polymerized butadiene hydrocarbon polymer synthetic latex in which the surfaces of the polymer particles are incompletely covered with emulsifier and the polymer constituent of which contains at least 51 percent by weight of a bound butadiene-1,3 hydrocarbon which comprises adding an aqueous dispersion of an inorganic reinforcing pigment having an average particle size of less than 2000 A. to the said butadiene hydrocarbon polymer latex, freezing said latex with said inorganic reinforcing pigment dispersion therein to a solid mass at a temperature above temperatures at which the latex coagulates, and reconstituting a fluid latex from the frozen mass of latex by completely thawing the frozen mass.

9. A method for internally reinforcing butadiene-styrene copolymer particles of an emulsion-polymerized butadiene-styrene copolymer synthetic latex in which the surfaces of the polymer particles are incompletely covered with emulsifier and the butadiene-styrene copolymer constituent of which contains at least 51 percent by weight of a bound butadiene-1,3 hydrocarbon which comprises adding an aqueous dispersion of an inorganic reinforcing pigment to the said butadiene-styrene copolymer latex, freezing said latex with said inorganic reinforcing pigment dispersion therein to a solid mass at a temperature above temperatures at which the latex coagulates, and reconstituting a fluid latex from the frozen mass of latex by completely thawing the frozen mass.

10. A method for internally reinforcing butadiene-styrene copolymer particles of an emulsion-polymerized butadiene-styrene copolymer synthetic latex in which the surfaces of the polymer particles are incompletely covered with an emulsifier and the butadiene-styrene copolymer constituent of which contains at least 51 percent by weight of a bound butadiene-1,3 hydrocarbon which comprises adding an aqueous dispersion of an inorganic reinforcing pigment to the said butadiene-styrene copolymer latex, freezing said latex with said inorganic reinforcing pigment dispersion therein to a solid mass at a temperature between 30° to —50° F. and at a temperature above temperatures at which the latex coagulates, and reconstituting a fluid latex from the frozen mass of latex by completely thawing the frozen mass.

11. A method for internally reinforcing butadiene-styrene copolymer particles of an emulsion-polymerized butadiene-styrene copolymer synthetic latex in which the surfaces of the polymer particles are incompletely covered with an emulsifier and the butadiene-styrene copolymer constituent of which contains at least 51 percent by weight of a bound butadiene-1,3 hydrocarbon which comprises adding an aqueous dispersion of an inorganic reinforcing pigment to the said butadiene-styrene copolymer latex, freezing said latex with said inorganic reinforcing pigment dispersion therein to a solid mass at a temperature between 30° to −50° F. and at a temperature above temperatures at which the latex coagulates and within five minutes after said latex is subjected to the freeze temperature, and reconstituting a fluid latex from the frozen mass of latex by completely thawing the frozen mass.

12. A method for internally reinforcing butadiene-styrene copolymer particles of an emulsion-polymerized butadiene-styrene copolymer synthetic latex in which the surfaces of the polymer particles are incompletely covered with an emulsifier and the butadiene-styrene copolymer constituent of which contains at least 51 percent by weight of a bound butadiene-1,3 hydrocarbon which comprises adding an aqueous dispersion of an inorganic reinforcing pigment to the said butadiene-styrene copolymer latex, reducing the pH of the said latex to a pH value above pH values sufficient to cause coagulation of the said latex, freezing said latex with said inorganic reinforcing pigment dispersion therein to a solid mass at a temperature above temperatures at which the latex coagulates, and reconstituting a fluid latex from the frozen mass of latex by completely thawing the frozen mass.

13. A method for internally reinforcing butadiene-styrene copolymer particles of an emulsion-polymerized butadiene-styrene copolymer synthetic latex in which the surfaces of the polymer particles are incompletely covered with an emulsifier and the butadiene-styrene copolymer constituent of which contains at least 51 percent by weight of a bound butadiene-1,3 hydrocarbon which comprises adding an aqueous dispersion of an inorganic reinforcing pigment having an average particle size of less than 2000 A. to the said butadiene-styrene copolymer latex, freezing said latex with said inorganic reinforcing pigment dispersion therein to a solid mass at a temperature above temperatures at which the latex coagulates, and reconstituting a fluid latex from the frozen mass of latex by completely thawing the frozen mass.

References Cited by the Examiner

UNITED STATES PATENTS

| | | | |
|---|---|---|---|
| 2,419,512 | 4/1947 | Vesce | 260—29.7 |
| 2,512,697 | 6/1950 | Te Grotenhuis | 260—29.7 |
| 3,031,427 | 4/1962 | Talalay | 260—29.7 |

FOREIGN PATENTS

| | | |
|---|---|---|
| 676,592 | 7/1952 | Great Britain. |
| 758,622 | 10/1956 | Great Britain. |
| 841,758 | 7/1960 | Great Britain. |

OTHER REFERENCES

Ind. Eng. Chem., vol. 43, No. 3, 3–1951, pp. 757–765, p. 759 specifically relied on.

Adams et al.: "Master Batches from Carbon Blacks with GR–S Latices," 3–1951.

The Vanderbilt Rubber Handbook, 1958, pub. by R. T. Vanderbilt Co., N.Y., p. 338 relied upon.

MURRAY TILLMAN, *Primary Examiner.*

DANIEL ARNOLD, LEON J. BERCOVITZ, WILLIAM H. SHORT, *Examiners.*

E. B. WOODRUFF, J. ZIEGLER, G. F. LESMES,
*Assistant Examiners.*